A. R. PRITCHARD.
BAIL BEARING FOR LANTERNS.
APPLICATION FILED FEB. 23, 1911.

992,984.

Patented May 23, 1911.

Witnesses:
Clarence W. Carroll
L. Thon

Inventor:
Albert R. Pritchard
by his attorneys
Osgood, Davis & Dorsey

UNITED STATES PATENT OFFICE.

ALBERT R. PRITCHARD, OF ROCHESTER, NEW YORK.

BAIL-BEARING FOR LANTERNS.

992,984.  Specification of Letters Patent.  Patented May 23, 1911.

Application filed February 23, 1911.  Serial No. 610,442.

*To all whom it may concern:*

Be it known that I, ALBERT R. PRITCHARD, a citizen of the United States, and resident of Rochester, in the county of Monroe and State of New York, have invented certain new and useful Improvements in Bail-Bearings for Lanterns, of which the following is a specification.

This invention relates to tubular lanterns of the ordinary form, with wire bails or handles pivotally attached to the air-tubes.

The object of the invention is to produce a neat, simple and strong bearing or connection between the air-tube and the bail of the tubular lantern, and incidentally the bearing by which the bail is retained frictionally in upright position conveniently ready for use.

To these ends the invention consists in the construction hereinafter described, as it is defined in the succeeding claims.

Figure 1:
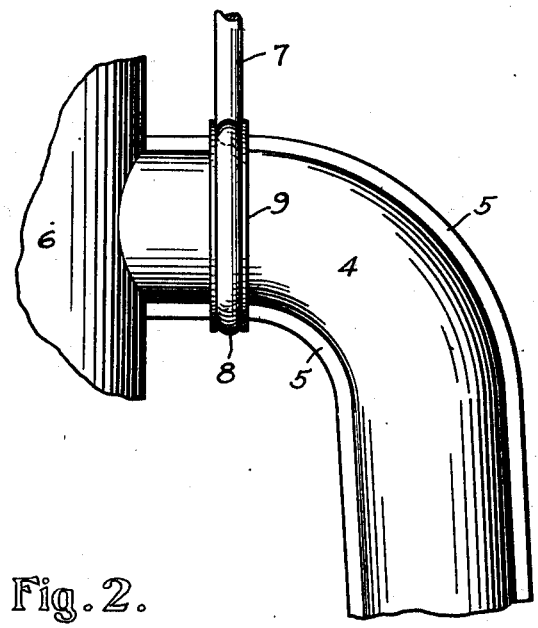
Figure 2:
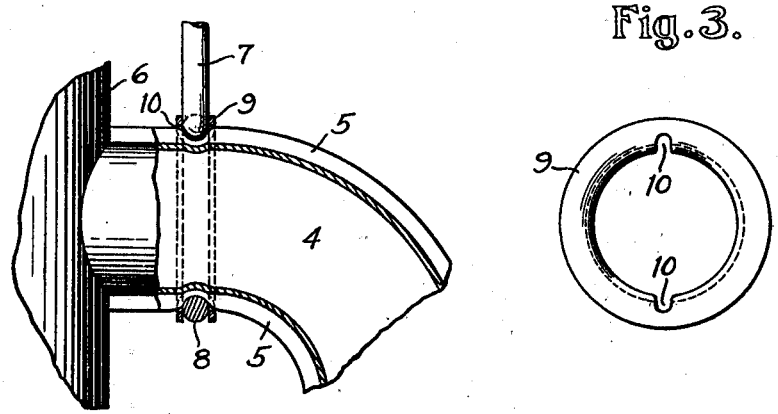
Figure 3:
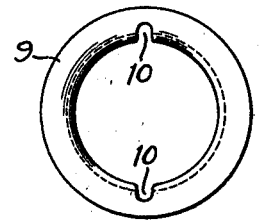

In the accompanying drawings:—Figure 1 is a front-elevation, on an enlarged scale, of a portion of a tubular lantern embodying the present invention; Fig. 2 is a front-elevation of the same, partly in vertical section; and Fig. 3 is a side-elevation of the bearing-ring.

As the invention is applicable to tubular lanterns of ordinary form, the drawings show only so much of the lantern as is necessary for an understanding of the invention. The lantern is illustrated as provided with air-tubes of ordinary form, comprising the usual pressed sheet-metal members 4 connected by seams 5, the upper ends of these air-tubes being connected with the dome 6 of the lantern. The bail 7, with the exception of its extremities, is of the usual form, and consists of resilient wire. At its extremities the bail is provided at each end with a circular eye 8. This eye is seated in an annular channel-shaped bearing or ring 9, which may be formed in any well known manner, preferably by stamping from flat sheet-metal.

The bearing-ring 9 is provided with oppositely-disposed recesses 10, adapted to receive the seams 5 of the air-tube. In the process of assembling the parts of the lantern, before the air-tube is fixed to the dome, the bearing-ring 9 is slipped over the end of the air-tube, with the recesses 10 in engagement with the seams. The bearing-ring may be secured in position in any convenient manner, but as a simple method of doing so I prefer to subject it to a radial compression, thereby slightly reducing the diameter of the ring so as to cause it to embrace the air tube tightly. In Fig. 2 this reduction is indicated, in an exaggerated manner, by showing the air-tube as somewhat indented by the bearing-ring. The seams are illustrated as recessed slightly, in line with the annular channel of the bearing-ring, so as to receive the eye-portion 8 of the bail, which latter is put in place after the other parts of the lantern are assembled.

Owing to the resiliency of the bail, the eye-portion 8 may be formed to clasp the bearing-ring 9 with sufficient friction to retain the bail in upright position ready for convenient use, or in any other position in which it may be left by the user. It will be apparent that, even if the bearing-ring be left loose upon the air-tube, it cannot move thereon when the parts are all assembled, since rotation of the bearing-ring on the tube is prevented by the engagement of the seams 5 with the recesses 10, while lateral movement of the bearing-ring is prevented by the engagement of the bail with the recesses in the seams, as illustrated in Fig. 2. The bearing-ring, in addition to acting as a bearing, and as a retaining device for the bail, constitutes also a reinforcement for the air-tube, and the bearing-surface between the ring and the bail is so large that it is not subject to any substantial wear, even if roughly handled.

I am aware that it has been previously proposed to connect the bail with the dome of a lantern by providing the bail with an eye surrounding the air-tube at its connection with the dome, but it is novel, so far as I am informed, to produce a bail-bearing by mounting an annular channel-shaped bearing member upon the air-tube.

I claim:

1. In a tubular lantern, the combination, with an air-tube, of an integral, annular, channel-shaped bearing ring surrounding the air-tube and independent of the dome of the lantern, and a bail having at the end an eye seated in said bearing-member.

2. In a tubular lantern, the combination, with a longitudinally-seamed air-tube, of an integral, annular, channel-shaped bearing-member surrounding the air-tube and recessed to receive the seams of the air-tube, and a bail having at the end an eye seated in and resiliently engaging said bearing-member.

ALBERT R. PRITCHARD.

Witnesses:
D. GURNEE,
L. THON.

Copies of this patent may be obtained for five cents each, by addressing the "Commissioner of Patents, Washington, D. C."